(12) United States Patent
Goldenberg et al.

(10) Patent No.: US 8,671,236 B2
(45) Date of Patent: Mar. 11, 2014

(54) COMPUTER BUS WITH ENHANCED FUNCTIONALITY

(75) Inventors: Dror Goldenberg, Zichron Yaakov (IL); Doron Fael, Zichron Yaakov (IL); Gil Adar, Pardes Hana Karkur (IL)

(73) Assignee: Mellanox Technologies Ltd., Yokneam (IL)

(*) Notice: Subject to any disclaimer, the term of this patent is extended or adjusted under 35 U.S.C. 154(b) by 298 days.

(21) Appl. No.: 13/153,477

(22) Filed: Jun. 6, 2011

(65) Prior Publication Data
US 2012/0311220 A1  Dec. 6, 2012

(51) Int. Cl.
*G06F 13/14* (2006.01)

(52) U.S. Cl.
USPC .................... 710/305; 710/313; 710/314

(58) Field of Classification Search
USPC ............ 710/305, 313, 314, 72, 74; 713/300, 713/323
See application file for complete search history.

(56) References Cited

U.S. PATENT DOCUMENTS

| | | | |
|---|---|---|---|
| 6,529,965 B1* | 3/2003 | Thomsen et al. | 710/8 |
| 7,152,136 B1* | 12/2006 | Charagulla | 710/315 |
| 7,343,147 B2* | 3/2008 | Ruff et al. | 455/343.1 |
| 7,376,773 B2* | 5/2008 | Kim et al. | 710/74 |
| 7,413,129 B2* | 8/2008 | Fruhauf | 235/492 |
| 8,239,581 B2* | 8/2012 | Ibarra et al. | 710/2 |
| 2008/0012524 A1* | 1/2008 | Yu | 320/103 |
| 2011/0167287 A1* | 7/2011 | Walsh et al. | 713/323 |
| 2012/0290761 A1* | 11/2012 | Chen et al. | 710/305 |

OTHER PUBLICATIONS

PCI-SIG. PCI Express to PCI/PCI-X Bridge. Specification. Revision 1.0. Jul. 14, 2003.*
PCI-SIG. PCI Express. Base Specification. Revision 1.1. Mar. 28, 2005.*
Budruk et al. PCI Express System Architecture. Apr. 2008.*
PCI-SIG®, "PCI Express™® Card Electromechanical Specification", Revision 2.0, Apr. 11, 2007.
Advanced Configuration and Power Interface (ACPI) Specification, Revision 4.0a, Apr. 5, 2010.
Serial ATA International Organization, "Serial ATA Revision 3.0 Specification", Jun. 2, 2009.

* cited by examiner

*Primary Examiner* — Matthew D Spittle
(74) *Attorney, Agent, or Firm* — D. Kligler IP Services Ltd.

(57) ABSTRACT

A method for computing includes connecting a host device to a peripheral device via a bus that is physically configured in accordance with a predefined standard and includes multiple connection pins that are specified by the standard, including a plurality of ground pins. At least one pin, selected from among the pins on the bus that are specified as the ground pins, is used in order to indicate to the peripheral device that the host device has an extended operational capability.

36 Claims, 3 Drawing Sheets

COMPUTER BUS WITH ENHANCED FUNCTIONALITY

FIELD OF THE INVENTION

The present invention relates generally to computer systems, and specifically to communications between a computer host and peripheral devices.

BACKGROUND OF THE INVENTION

PCI Express® (Peripheral Component Interconnect Express, commonly abbreviated PCIe) is a computer bus standard defined by the PCI-SIG (PCI Special Interest Group) organization. Specifications of the PCIe standard are available on the PCI-SIG Web site, at www.pcisig.com/specifications/pciexpress/. PCIe is widely used both as a motherboard-level interconnect (to link motherboard-mounted peripherals) and as an expansion card interface for add-in boards. PCIe links are thus used, inter alia, to connect the host processor of a computer to a network interface controller (NIC) for purposes of network communications.

A PCIe link between devices can comprise between one and thirty-two lanes, which carry duplex serial data between the devices. In addition, a certain set of pins is allocated for management functions and providing electrical power to the peripheral device, as shown in the table below, taken from the *PCI Express Card Electromechanical Specification*, Revision 2.0 (Apr. 11, 2007), page 69:

TABLE I

PCI EXPRESS CONNECTOR PINOUT

| Pin | Side B | Side A | Comments |
|---|---|---|---|
| 1 | +12 V | PRSNT1# | Pulled low to indicate card inserted |
| 2 | +12 V | +12 V | |
| 3 | Reserved | +12 V | |
| 4 | Ground | Ground | |
| 5 | SMCLK | TCK | System Management Bus (SMBus) and |
| 6 | SMDAT | TDI | JTAG (IEEE 1149.1 testing) port pins |
| 7 | Ground | TDO | |
| 8 | +3.3 V | TMS | |
| 9 | TRST# | +3.3 V | |
| 10 | +3.3Vaux | +3.3 V | Standby power |
| 11 | WAKE# | PERST# | Link reactivation, fundamental reset |

Wake-on-LAN (WOL) is an Ethernet computer networking standard that allows a host computer to be turned on by a network message. It permits the computer to automatically power down to a standby mode when it is not busy, and then power up when needed. The network message has the form of a "magic packet," which is sent over the local area network (LAN) to the NIC of the computer that is to be awakened. The magic packet has a special format, which is recognized by the NIC as a "wake-up call." Upon detecting a magic packet, the NIC asserts a wake signal to the host computer (such as the PCIe WAKE# signal listed in the table above), which initiates system wake-up.

SUMMARY

Computer bus standards enable interoperability between components made by different manufacturers. Embodiments of the present invention that are described hereinbelow expand the capabilities of existing computer buses, while maintaining backward capability with the standards that define bus operation.

There is therefore provided, in accordance with an embodiment of the present invention, a method for computing, which includes connecting a host device to a peripheral device via a bus that is physically configured in accordance with a predefined standard and includes multiple connection pins that are specified by the standard, including a plurality of ground pins. At least one pin, selected from among the pins on the bus that are specified as the ground pins, is used in order to indicate to the peripheral device that the host device has an extended operational capability.

In disclosed embodiments, the at least one pin floats, and the method may include sensing, at the peripheral device, that the at least one pin is floating, and operating in accordance with the extended operational capability of the host device. I one embodiment, two of the pins on the bus that are specified as the ground pins are floated, and sensing that the at least one pin is floating includes detecting that both of the two of the pins are floating as a condition for operating in accordance with the extended operational capability.

In a disclosed embodiment, the at least one pin is used to indicate an extended power budget provided by the host device. The extended power budget provides electrical power to the peripheral device while the host device is in a standby mode that is in excess of a basic power budget of the standby mode that is specified by the standard.

Alternatively or additionally, the at least one pin is used to indicate an extended communication capability provided by the host device. The extended communication capability may include support, via the bus, for a type of communication interface that is not provided by the standard, such as a Network Communications Services Interface (NCSI).

The bus may be a PCI Express bus, and the peripheral device may include a network interface controller (NIC). In one embodiment, the extended operational capability includes an extended budget of electrical power provided to the NIC while the host device is in a standby mode, and the method includes providing a wake-on-LAN (WOL) service from the NIC to the host device using the electrical power in the extended budget.

There is also provided, in accordance with an embodiment of the present invention, a method for computing, which includes connecting a peripheral device to a host device to via a bus that is physically configured in accordance with a predefined standard and includes multiple connection pins that are specified by the standard, including a plurality of ground pins. The peripheral device detects an extended operational capability of the host device by sensing an electrical level of at least one pin selected from among the pins on the bus that are specified as the ground pins and then operates in accordance with the extended operational capability.

There is additionally provided, in accordance with an embodiment of the present invention, a computing device, including a host processor and a bus, which is coupled to the host processor and which is physically configured in accordance with a predefined standard, which specifies multiple connection pins of the bus, including a plurality of ground pins. The bus includes at least one pin, selected from among the pins on the bus that are specified as the ground pins, that is used to indicate to a peripheral device connected to the bus that the computing device has an extended operational capability.

There is further provided, in accordance with an embodiment of the present invention, a computing device, including a bus interface, which is configured to connect a the computing device to a host device via a bus that is physically configured in accordance with a predefined standard and includes multiple connection pins that are specified by the standard, including a plurality of ground pins. The bus interface includes a sensing circuit, which is coupled to detect an electrical level of at least one pin selected from among the pins on the bus that are specified as the ground pin and to output a signal in response to the electrical level. A controller is coupled to receive the signal from the sensing circuit and is configured to cause the computing device, in response to the signal, to operate in accordance with an extended operational capability of the host device that is indicated by the floating of the at least one pin.

The present invention will be more fully understood from the following detailed description of the embodiments thereof, taken together with the drawings in which:

DETAILED DESCRIPTION OF EMBODIMENTS

Figure 1:
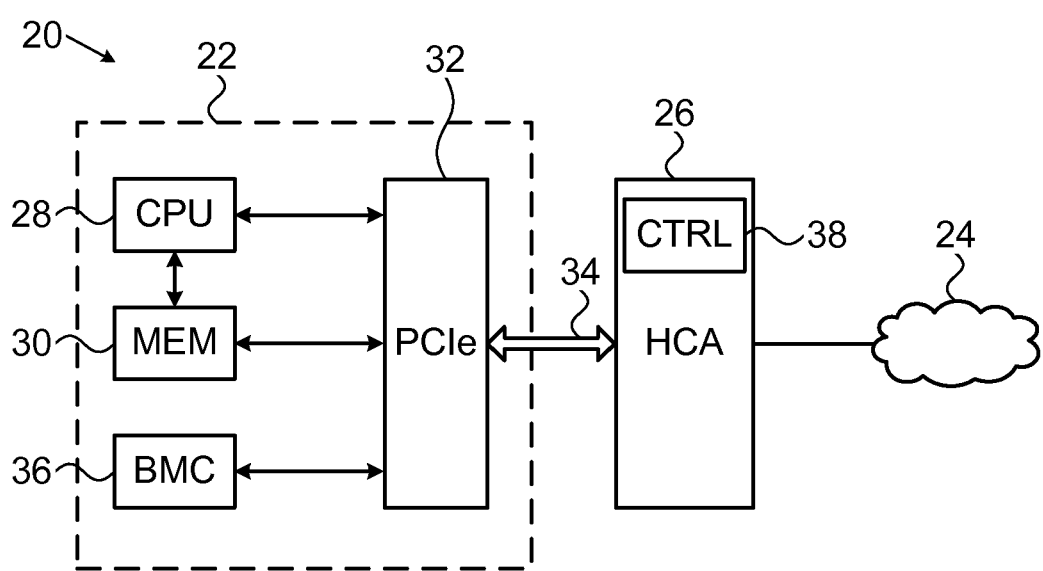
FIG. 1 is a block diagram that schematically illustrates a computer system, in accordance with an embodiment of the present invention.

Despite the speed and versatility of the PCIe bus, aspects of the standards defining the bus are or may become inadequate to meet the needs of developing system applications. For example, the PCIe standard specifies that in standby operation (sleep or hibernation state), host devices are required to provide auxiliary power to peripheral devices on the bus only at 3.3 V, with a maximum power level of 1.2375 W. This low power budget is sufficient to enable legacy, low-speed NICs to continue operating in standby mode, so as to detect magic packets and wake the host device when required for WOL operation. High-speed NICs, however, such as those used for 10 Gigabit and 40 Gigabit Ethernet and InfiniBand™ host channel adapters (HCAs), require considerably more power for standby operation, typically 5-12 W. The mismatch between the sleep-mode power supplied by the host and that required by the NIC makes it difficult or impossible to apply the standard WOL protocol to awaken PCIe-based hosts over such high-speed networks.

Some embodiments of the present invention address this problem by extending the capabilities of the PCIe bus to operate beyond the bounds of the standard, specifically by offering a higher power budget in standby mode (typically in terms of both voltage and power level). This enhancement is implemented on both sides of the bus, i.e., it is supported by both the host device and the NIC. The physical configuration of the bus, however, remains unchanged to ensure backward compatibility. In other words, the enhanced host is still capable of operating with legacy NICs, and the enhanced NIC can still operate with legacy hosts (but may not be able to support WOL in this case).

It is desirable that the enhanced host and NIC be able to recognize one another's capabilities, and thus avoid the need for manual configuration of these capabilities by a system operator. For this purpose, the host signals its capabilities using at least one of the pins on the PCIe bus that are specified as ground pins by the standard. (There is a sufficient number of ground pins so that at least one or two can be diverted for this use without affecting other aspects of bus performance.) Specifically, the host may float one or more specified "ground" pins in order to indicate to the NIC that it has this extended operational capability. The enhanced NIC senses the electrical level of the specified pins and, if the level is not ground, detects the extended capability of the host and operates accordingly. The NIC is thus able to draw sufficient power in standby mode to provide WOL support over a high-speed Ethernet or InfiniBand network.

The specified ground pins may be used in this manner to signal extended capabilities in other areas, and not only power budget. For example, in another embodiment, an ungrounded "ground" pin may be used to indicate an extended communication capability provided by the host device, such as support, via the PCIe bus, for a type of communication interface that is not provided by the standard.

Although the embodiments described herein relate specifically to communication between a host computer and a NIC, the principles of the present invention may similarly be applied to communications between host devices and peripheral devices of other types, such as storage and display devices. Furthermore, these principles can be useful not only in expanding the capabilities of the PCIe bus, but also in other standard bus architectures, such as the Serial Advanced Technology Attachment (SATA) bus.

FIG. 1 is a block diagram that schematically illustrates a computer system 20, in accordance with an embodiment of the present invention. A host computer 22 in system 20 communicates with a high-speed network 24 via a NIC, implemented in this case as a HCA 26. Network 24 may comprise, for example, a high-speed Ethernet or InfiniBand switch fabric, which provides local-area communications among host computers in a cluster. Computer 22 is configured, when not busy with computing tasks, to power down to a standby mode (such as S3 "sleep" or S4 "hibernation," as provided by the Advanced Configuration and Power Interface (ACPI) specification). While computer 22 is in standby mode, HCA 26 continues to operate at a reduced power level, and to monitor incoming traffic from network 24 for magic packets. Upon receiving such a packet, HCA 26 wakes computer 22, which then returns to working mode.

Computer 22 comprises at least one central processing unit (CPU) 28 and a memory 30, which are used in executing operating system and application software instructions. These components communicate via a PCIe bus 32 with HCA 26. Certain pins on bus 32, which are specified as ground pins by the PCIe standard, are used by computer 22 to signal to the HCA that it has extended operational capabilities, as described hereinbelow in greater detail. For example, these "ground" pins may be disconnected from the ground on the motherboard of computer 22 and allowed to float.

HCA 26 comprises a bus interface 34 for connecting the circuits of the HCA to bus 32. The bus interface includes a sensing circuit, which detects the electrical level of the floating "ground" pins on bus 32. Depending on this level, the sensing circuit outputs a signal to a controller 38 in HCA 26. In response to the signal, controller 38 directs the circuits of the HCA to operate in accordance with the extended capabilities of computer 22. Specifically, as noted earlier, the signal may indicate to controller 38 that computer 22 offers an extended power budget for standby operation, and the controller will therefore direct the circuits of the HCA to continue operating in standby mode and to perform WOL operations as appropriate. These aspects of the operation of bus 32 and interface 34 are described hereinbelow in greater detail with reference to FIG. 2.

In the embodiment shown in FIG. 1, computer 22 also comprises a service processor, in the form of a Baseboard Management Controller (BMC) 36. The BMC is separate and independent from main CPU 28 and is generally not involved in tasks such as running applications and manipulating data.

Rather, BMC 36 controls internal management processes of computer 22, even when CPU 28 is not operating, and may thus be used to wake the CPU from standby mode.

The BMC in many high-speed servers communicates with other server components via a Network Communications Services Interface (NCSI) bus. The NCSI bus and protocol bypass the main operating system and drivers of computer 22. It is therefore advantageous that HCA 26 be able to communicate with BMC 36 via the NCSI bus, in order to facilitate WOL functions and possibly carry out other management operations, as well. The PCIe standard, however, does not support the NCSI bus.

To enable communications between HCA 26 and BMC 36 without adding a dedicated connector for this purpose, computer 22 may be wired so that some of the pins in bus 32 can be used for NCSI communication. As in the case of the extended power capability of computer 22, the computer may indicate this extended communication capability by allowing one or more "ground" pins on bus to have a non-ground level. Upon detecting this configuration on the host side, controller 38 may use the appropriate pins of bus 32 to communicate using the NCSI protocol with BMC 36. Details of this scheme are described in greater detail hereinbelow with reference to FIG. 3.

Figure 2:
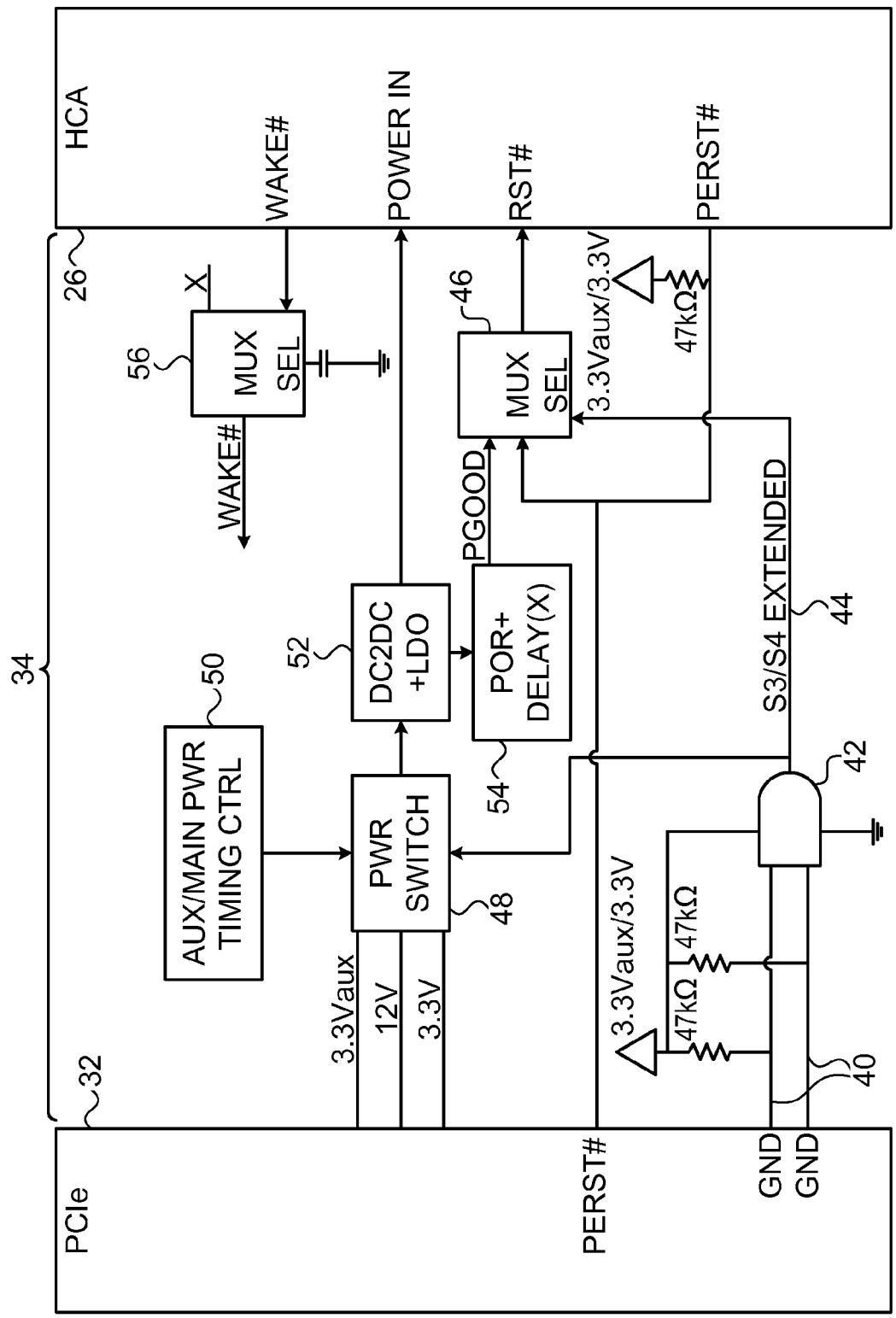
FIGS. 2 and 3 are block diagrams that schematically illustrate elements of an interface between a host processor and a NIC, in accordance with embodiments of the present invention.

FIG. 2 is a block diagram that schematically shows elements of interface 34, in accordance with an embodiment of the present invention. Interface 34 is typically implemented as part of HCA 26, but it may alternatively be incorporated in system 20 as a separate unit.

In the embodiment of FIG. 2, two "ground" pins 40 of PCIe bus 32, such as pins A4 and B4 (as listed in Table I above), are left unconnected—and thus floating—on the motherboard of computer 22. These particular ground pins are a good choice to float, since they do not serve as the return lines for high-speed signals on the bus. In practice, a single floating ground pin would be sufficient for the purposes of the present embodiment, but two floating pins affords added safety (by avoiding errors that could arise if a single pin is accidentally floating). Floating pins 40 is an efficient way to signal the capabilities of computer 22, since it is passive and requires no additional circuitry to be added on the computer side of bus 32. Alternatively, the levels of one or both pins may be actively varied to signal the extended capabilities of the computer.

Pins 40 are connected, via respective resistors in interface 34, to the 3.3 V auxiliary voltage supply on bus 32, and are also connected to the inputs of an AND gate 42. The AND gate serves as a sensing circuit: When pins 40 are floating, the inputs to the AND gate are pulled high, and the signal level on an output 44 of the AND gate will also be high, indicating that computer 22 is capable of providing an extended power budget for standby mode (S3 or S4) support. Alternatively, other types of sensing circuits may be used, as will be apparent to those skilled in the art. In legacy computers, on the other hand, pins 40 will actually be grounded as specified by the PCIe standard, so that output 44 will be low, indicating to the HCA that only the standard power budget is available in standby mode.

Output 44 drives a power switch 48, which selects the voltages to supply to HCA 26 in conjunction with a power timing controller 50, which indicates whether computer 22 is in full-power or standby mode. If output 44 is low (meaning that only the standard power budget is provided for standby mode), switch 48 will provide only 3.3 V auxiliary power in standby mode. If output 44 is high, however, switch will supply 3.3 V and 12 V in standby mode, with an enhanced power level. For example, computer 22 may supply, via PCIe bus 32, up to 1 Amp at 12 V in standby mode along with 375 mA at 3.3 V. A DC-to-DC converter and low-dropout (LDO) regulator 52 convert the input voltages from bus 32 to the specific voltage levels required by HCA 26.

Converter/regulator 52 powers a power-on reset (POR) circuit 54, which provides an input PGOOD to a multiplexer 46, with a delay X sufficient to ensure that the voltage has stabilized before proceeding with the reset. When output 44 is high, multiplexer 46 selects PGOOD as the input to the reset (RST#) pin of HCA 26. Based on this input, controller 38 (FIG. 1) concludes that computer 22 will provide an extended power budget for standby mode, and therefore configures the circuits of HCA to provide WOL service in standby mode. Otherwise, when output 44 is low, multiplexer 46 connects the RST# pin to the conventional PCIe reset (PERST#) pin of the PCIe bus, leading controller 38 to conclude that WOL support will not be possible due to the limited standby power budget.

If a legacy HCA or other NIC is plugged into PCIe bus 32 instead of HCA 26, "ground" pins 40 on the computer bus connector will simply connect to corresponding ground pins on the NIC side. The fact that the pins are floating on the computer side will have no effect on operation.

As noted earlier, while computer 22 is in standby mode, HCA 26 monitors incoming traffic from network 24 for magic packets. Upon receiving such a packet, the HCA asserts a WAKE# output, which is coupled through a multiplexer 56 (to ensure proper bias) to a WAKE# input of computer 22. The computer receives the input and resumes normal, full-power operation.

Figure 3:
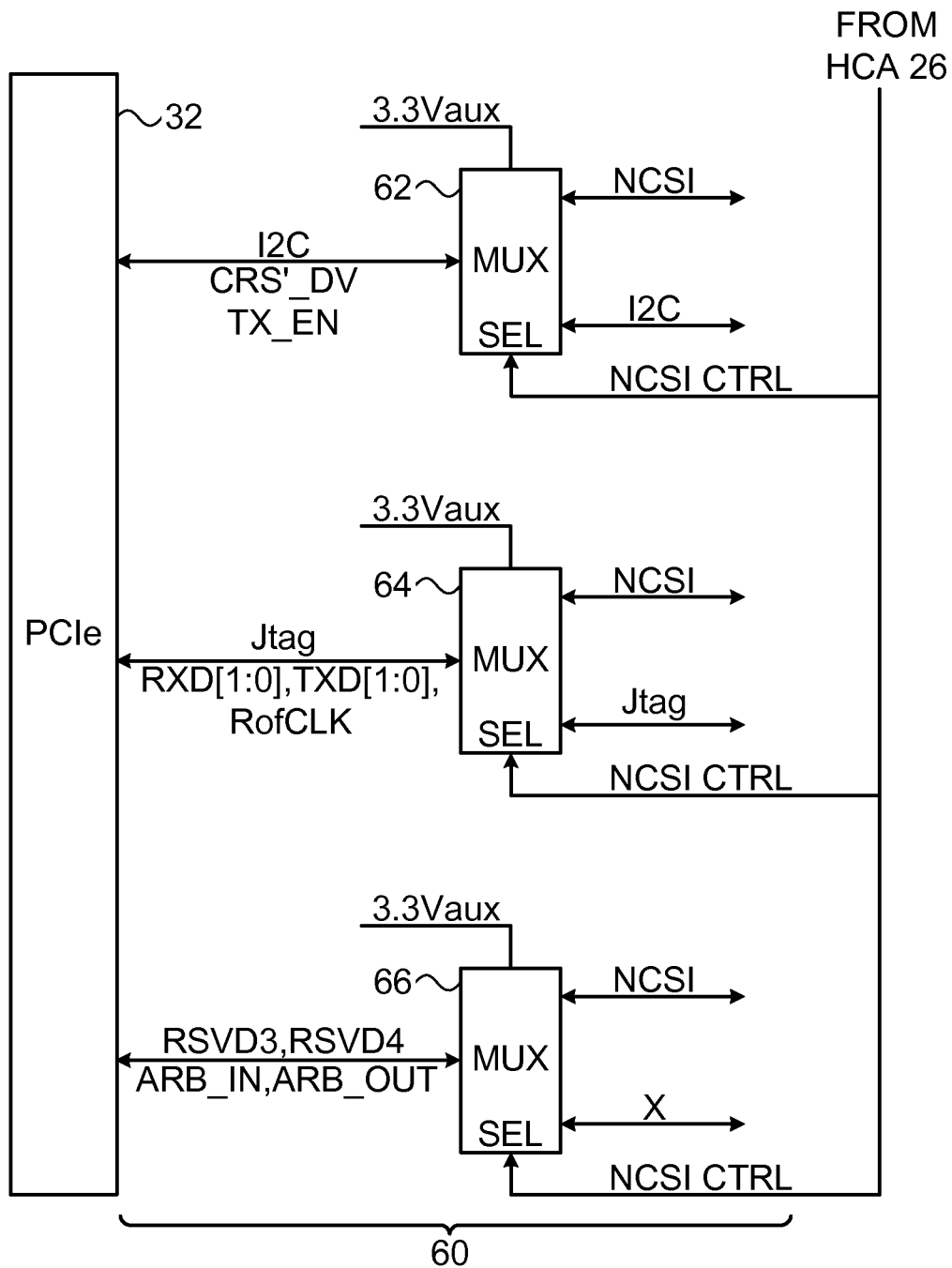

FIG. 3 is a block diagram that schematically shows elements 60 of interface 34, in accordance with another embodiment of the present invention. Elements 60 are directed to providing an extended communication capability on PCIe bus 32—specifically, support for NCSI. Computer 22 may signal the availability of this capability in the manner described above, by floating one or both of "ground" pins 40. In order to support both the extended power budget and the extended communication capability, one of pins 40 (for example, pin A4) may be used to signal the power budget, and the other (B4) to signal the communication capability. HCA 26 may thus detect which of these two extended capabilities (none, one, or both) the computer offers.

In the embodiment shown in FIG. 3, NCSI traffic is carried over the pins on bus 32 that are normally used, in conventional PCIe operation, for SMBus and JTAG operations (see Table I above): pins A5 and A6 for SMBus (referred to in the figure as I2C, on which SMBus is based), and pins B5-B9 and A9 for JTAG. To make up the full complement of nine pins required by NCSI, two reserved pins, which are unused in the current PCIe standard, are also assigned. The NCSI signals that are allocated to these nine pins are indicated in FIG. 3, although other allocations may similarly be used.

Upon receiving a signal from the PCIe interface indicating that computer 22 supports NCSI communication over bus 32, controller 38 asserts a NCSI control signal to a set of multiplexers 62, 64, 66. These multiplexers direct the respective NCSI signal lines, as marked in FIG. 3, from HCA 26 to the corresponding I2C, JTAG and reserved pins on the bus. Computer 22 is likewise wired to connect these pins to the appropriate signal lines of BNC 36. The HCA is thus enabled to communicate via bus with BMC 36, for WOL operation and possibly other purposes.

On the other hand, if controller 38 determines that the computer does not support NCSI over the bus, the NCSI control signal will remain unasserted. Multiplexers 62, 64, 66 will then connect the standard I2C and JTAG lines of the HCA to the corresponding pins on the PCIe bus.

Although the above embodiments relate to specific protocols and capabilities, the principles of the present invention may similarly be applied to other types of peripheral devices and operational contexts. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for computing, comprising:
    connecting a host device to a peripheral device via a bus that is physically configured in accordance with a predefined standard and comprises multiple connection pins that are specified by the standard, including a plurality of ground pins;
    using at least one pin selected from among the pins on the bus that are specified as the ground pins in order to indicate to the peripheral device that the host device has an extended operational capability; and
    sensing, at the peripheral device, that the at least one pin is floating, and operating in accordance with the extended operational capability of the host device,
    wherein using the at least one pin comprises floating two of the pins on the bus that are specified as the ground pins, and wherein sensing that the at least one pin is floating comprises detecting that both of the two of the pins are floating as a condition for operating in accordance with the extended operational capability.

2. A method for computing, comprising:
    connecting a host device to a peripheral device via a bus that is physically configured in accordance with a predefined standard and comprises multiple connection pins that are specified by the standard, including a plurality of ground pins; and
    using at least one pin selected from among the pins on the bus that are specified as the ground pins in order to indicate to the peripheral device that the host device has an extended operational capability,
    wherein the at least one pin is used to indicate an extended power budget provided by the host device.

3. The method according to claim 2, wherein using the at least one pin comprises floating the at least one pin.

4. The method according to claim 3, and comprising sensing, at the peripheral device, that the at least one pin is floating, and operating in accordance with the extended operational capability of the host device.

5. The method according to claim 2, wherein the extended power budget provides electrical power to the peripheral device while the host device is in a standby mode that is in excess of a basic power budget of the standby mode that is specified by the standard.

6. The method according to claim 2, wherein the at least one pin is used to indicate an extended communication capability provided by the host device.

7. The method according to claim 6, wherein the extended communication capability comprises support, via the bus, for a type of communication interface that is not provided by the standard.

8. The method according to claim 2, wherein the peripheral device comprises a network interface controller (NIC).

9. The method according to claim 2, wherein the bus is a PCI Express bus.

10. A method for computing, comprising:
    connecting a host device to a peripheral device via a bus that is physically configured in accordance with a predefined standard and comprises multiple connection pins that are specified by the standard, including a plurality of ground pins; and
    using at least one pin selected from among the pins on the bus that are specified as the ground pins in order to indicate to the peripheral device that the host device has an extended operational capability,
    wherein the at least one pin is used to indicate an extended communication capability provided by the host device,
    wherein the extended communication capability comprises support, via the bus, for a type of communication interface that is not provided by the standard, and
    wherein the communication interface is a Network Communications Services Interface (NCSI).

11. The method according to claim 10, wherein using the at least one pin comprises floating the at least one pin.

12. The method according to claim 10, wherein the bus is a PCI Express bus.

13. The method according to claim 10, wherein the peripheral device comprises a network interface controller (NIC).

14. A method for computing, comprising:
    connecting a host device to a network interface controller (NIC) via a bus that is physically configured in accordance with a predefined standard and comprises multiple connection pins that are specified by the standard, including a plurality of ground pins; and
    using at least one pin selected from among the pins on the bus that are specified as the ground pins in order to indicate to the NIC that the host device has an extended operational capability,
    wherein the extended operational capability comprises an extended budget of electrical power provided to the NIC while the host device is in a standby mode, and wherein the method comprises providing a wake-on-LAN (WOL) service from the NIC to the host device using the electrical power in the extended budget.

15. The method according to claim 14, wherein using the at least one pin comprises floating the at least one pin.

16. The method according to claim 14, wherein the bus is a PCI Express bus.

17. A method for computing, comprising:
    connecting a peripheral device to a host device to via a bus that is physically configured in accordance with a predefined standard and comprises multiple connection pins that are specified by the standard, including a plurality of ground pins;
    detecting in the peripheral device an extended operational capability of the host device by sensing an electrical level of at least one pin selected from among the pins on the bus that are specified as the ground pins,
    wherein the electrical level of the at least one pin indicates that the host device provides an extended power budget while the host device is in a standby mode; and
    operating the peripheral device in accordance with the extended operational capability.

18. The method according to claim 17, wherein sensing the electrical level comprises detecting that the at least one pin is floating.

19. The method according to claim 17, wherein the peripheral device comprises a network interface controller (NIC), and wherein operating the peripheral device comprises providing a wake-on-LAN (WOL) service from the NIC to the host device using electrical power provided by the extended power budget.

20. The method according to claim 17, wherein the electrical level of the at least one pin indicates that the host device has an extended communication capability.

21. A method for computing, comprising:
connecting a peripheral device to a host device to via a bus that is physically configured in accordance with a predefined standard and comprises multiple connection pins that are specified by the standard, including a plurality of ground pins;
detecting in the peripheral device an extended operational capability of the host device by sensing an electrical level of at least one pin selected from among the pins on the bus that are specified as the ground pins; and
operating the peripheral device in accordance with the extended operational capability,
wherein the electrical level of the at least one pin indicates that the host device has an extended communication capability, and
wherein the extended communication capability comprises support, via the bus, for a Network Communications Services Interface (NCSI) that is not provided by the standard, and wherein operating the peripheral device comprises communicating between the peripheral device and a service processor in the host device via the NCSI.

22. A computing device, comprising:
a host processor; and
a bus, which is coupled to the host processor and which is physically configured in accordance with a predefined standard, which specifies multiple connection pins of the bus, including a plurality of ground pins, the bus comprising at least one pin, selected from among the pins on the bus that are specified as the ground pins, that is used to indicate to a peripheral device connected to the bus that the computing device has an extended operational capability,
wherein the at least one pin is used to indicate an extended power budget provided by the host device.

23. The device according to claim 22, wherein the at least one pin floats to indicate the extended operational capability.

24. The device according to claim 23, and comprising the peripheral device, wherein the peripheral device comprises a sensing circuit, which is coupled to detect that the at least one pin is floating, so as to cause the peripheral device to operate in accordance with the extended operational capability of the host device.

25. The device according to claim 22, wherein the extended power budget provides electrical power to the peripheral device while the host device is in a standby mode that is in excess of a basic power budget of the standby mode that is specified by the standard.

26. The device according to claim 22, wherein the at least one pin is used to indicate an extended communication capability provided by the host device.

27. The device according to claim 26, wherein the extended communication capability comprises support, via the bus, for a type of communication interface that is not provided by the standard.

28. The device according to claim 22, wherein the peripheral device comprises a network interface controller (NIC).

29. A computing device, comprising:
a host processor; and
a bus, which is coupled to the host processor and which is physically configured in accordance with a predefined standard, which specifies multiple connection pins of the bus, including a plurality of ground pins, the bus comprising at least one pin, selected from among the pins on the bus that are specified as the ground pins, that is used to indicate that the computing device has an extended operational capability,
wherein the at least one pin floats to indicate the extended operational capability; and
a peripheral device connected to the bus, wherein the peripheral device comprises a sensing circuit, which is coupled to detect that the at least one pin is floating, so as to cause the peripheral device to operate in accordance with the extended operational capability of the host device,
wherein the at least one pin comprises two of the pins on the bus that are specified as the ground pins, and wherein the sensing circuit is configured to detect that both of the two of the pins are floating as a condition for operating in accordance with the extended operational capability.

30. A computing device, comprising:
a host processor; and
a bus, which is coupled to the host processor and which is physically configured in accordance with a predefined standard, which specifies multiple connection pins of the bus, including a plurality of ground pins, the bus comprising at least one pin, selected from among the pins on the bus that are specified as the ground pins, that is used to indicate to a peripheral device connected to the bus that the computing device has an extended communication capability,
wherein the extended communication capability comprises support, via the bus, for a type of communication interface that is not provided by the standard, and
wherein the communication interface is a Network Communications Services Interface (NCSI).

31. A computing device, comprising:
a host processor; and
a bus, which is coupled to the host processor and which is physically configured in accordance with a predefined standard, which specifies multiple connection pins of the bus, including a plurality of ground pins, the bus comprising at least one pin, selected from among the pins on the bus that are specified as the ground pins, that is used to indicate to a network interface controller (NIC) connected to the bus that the computing device has an extended operational capability,
wherein the extended operational capability comprises an extended budget of electrical power provided to the NIC while the host device is in a standby mode, and wherein the NIC is configured to provide a wake-on-LAN (WOL) service to the device using the electrical power in the extended budget.

32. A computing device, comprising:
a bus interface, which is configured to connect the computing device to a host device via a bus that is physically configured in accordance with a predefined standard and comprises multiple connection pins that are specified by the standard, including a plurality of ground pins, and which comprises a sensing circuit, which is coupled to detect an electrical level of at least one pin selected from among the pins on the bus that are specified as the ground pin and to output a signal in response to the electrical level,
wherein the electrical level of the at least one pin indicates that the host device provides an extended power budget while the host device is in a standby mode; and a controller, which is coupled to receive the signal from the sensing circuit and is configured to cause the computing device, in response to the signal, to operate in accordance with an extended operational capability of the host device that is indicated by the floating of the at least one pin.

33. The device according to claim 32, wherein the sensing circuit is configured to detect that the at least one pin is floating.

34. The device according to claim 32, wherein the controller is a network interface controller (NIC), which is configured to provide a wake-on-LAN (WOL) service to the host device using electrical power provided by the extended power budget.

35. The device according to claim 32, wherein the electrical level of the at least one pin indicates that the host device has an extended communication capability.

36. A computing device, comprising:
a bus interface, which is configured to connect the computing device to a host device via a bus that is physically configured in accordance with a predefined standard and comprises multiple connection pins that are specified by the standard, including a plurality of ground pins, and which comprises a sensing circuit, which is coupled to detect an electrical level of at least one pin selected from among the pins on the bus that are specified as the ground pin and to output a signal in response to the electrical level; and a controller, which is coupled to receive the signal from the sensing circuit and is configured to cause the computing device, in response to the signal, to operate in accordance with an extended operational capability of the host device that is indicated by the floating of the at least one pin, wherein the electrical level of the at least one pin indicates that the host device has an extended communication capability, and wherein the extended communication capability comprises support, via the bus, for a Network Communications Services Interface (NCSI) that is not provided by the standard, and wherein the controller is configured to communicate with a service processor in the host device via the bus using the NCSI.

* * * * *